United States Patent [19]
Koch et al.

[11] Patent Number: 5,781,984
[45] Date of Patent: Jul. 21, 1998

[54] APPLIANCE FOR CUTTING-OFF AND/OR STRIPPING INSULATION

[75] Inventors: Max Koch, Meggen; Alois Lustenberger, Littau, both of Switzerland

[73] Assignee: Komax Holding AG, Dierikon, Switzerland

[21] Appl. No.: 738,594

[22] Filed: Oct. 29, 1996

Related U.S. Application Data

[62] Division of Ser. No. 404,856, Mar. 15, 1995, Pat. No. 5,596,802.

[30] Foreign Application Priority Data

Mar. 16, 1994 [CH] Switzerland ............... 00778/94

[51] Int. Cl.⁶ .................................................. H01R 43/01
[52] U.S. Cl. .................................... 29/564.4; 81/9.51
[58] Field of Search .................... 29/564.4, 33 M, 29/714, 715, 720, 564.6, 564.1; 81/9.51

[56] References Cited

U.S. PATENT DOCUMENTS

| | | | |
|---|---|---|---|
| 3,694,630 | 10/1972 | Tarbox | 29/714 X |
| 4,089,405 | 5/1978 | Loomis et al. | 29/715 X |
| 4,601,093 | 7/1986 | Cope | 29/564.4 |
| 4,649,621 | 3/1987 | Dusel et al. | 29/564.4 |
| 4,745,828 | 5/1988 | Stephen | 81/9.51 |
| 4,763,411 | 8/1988 | Takeshida | 81/9.51 X |
| 4,999,910 | 3/1991 | Cross | 81/9.51 X |
| 5,060,395 | 10/1991 | Pepin | 29/33 M X |
| 5,140,873 | 8/1992 | Schwartzman | 81/9.51 X |
| 5,253,555 | 10/1993 | Hoffa | 81/9.51 |

*Primary Examiner*—William R. Briggs
*Attorney, Agent, or Firm*—Loeb & Loeb LLP

[57] ABSTRACT

The conductor end to be worked is clamped behind the conductor end section (5) to be stripped and is held in its axial position. Subsequently a scanning arrangement displaceable relative to the free end in longitudinal direction of the conductor end section (5) is used to determine the free end of this conductor end section (5), then the cutting knives (12, 13) are advanced into cutting contact with the conductor end section (5) by a distance (x) corresponding to the severing and/or insulation stripping length previously determined from the end position, and after cutting off the requested layer by means of cutting knives (12, 13) the latter are used to push the cut-off layer towards the end, and this cut-off and/or insulation stripping process can be repeated once or several times with graduated cutting depths, if need be.

12 Claims, 11 Drawing Sheets

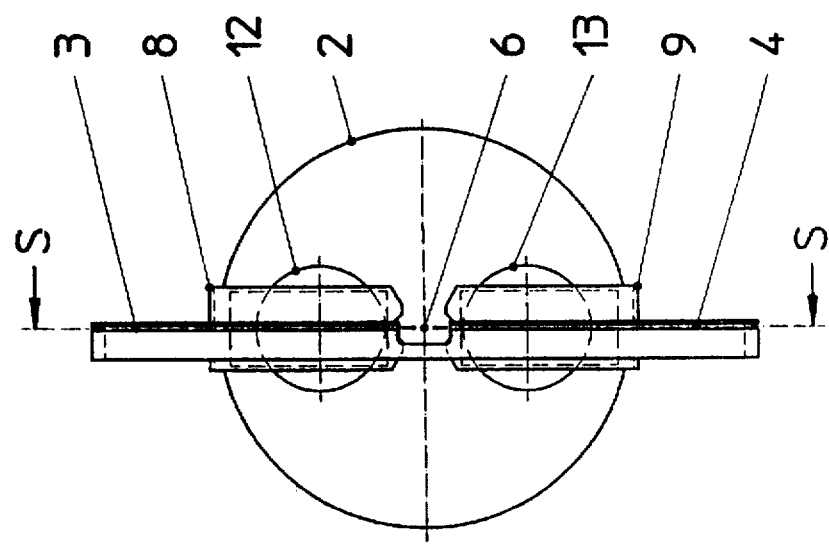
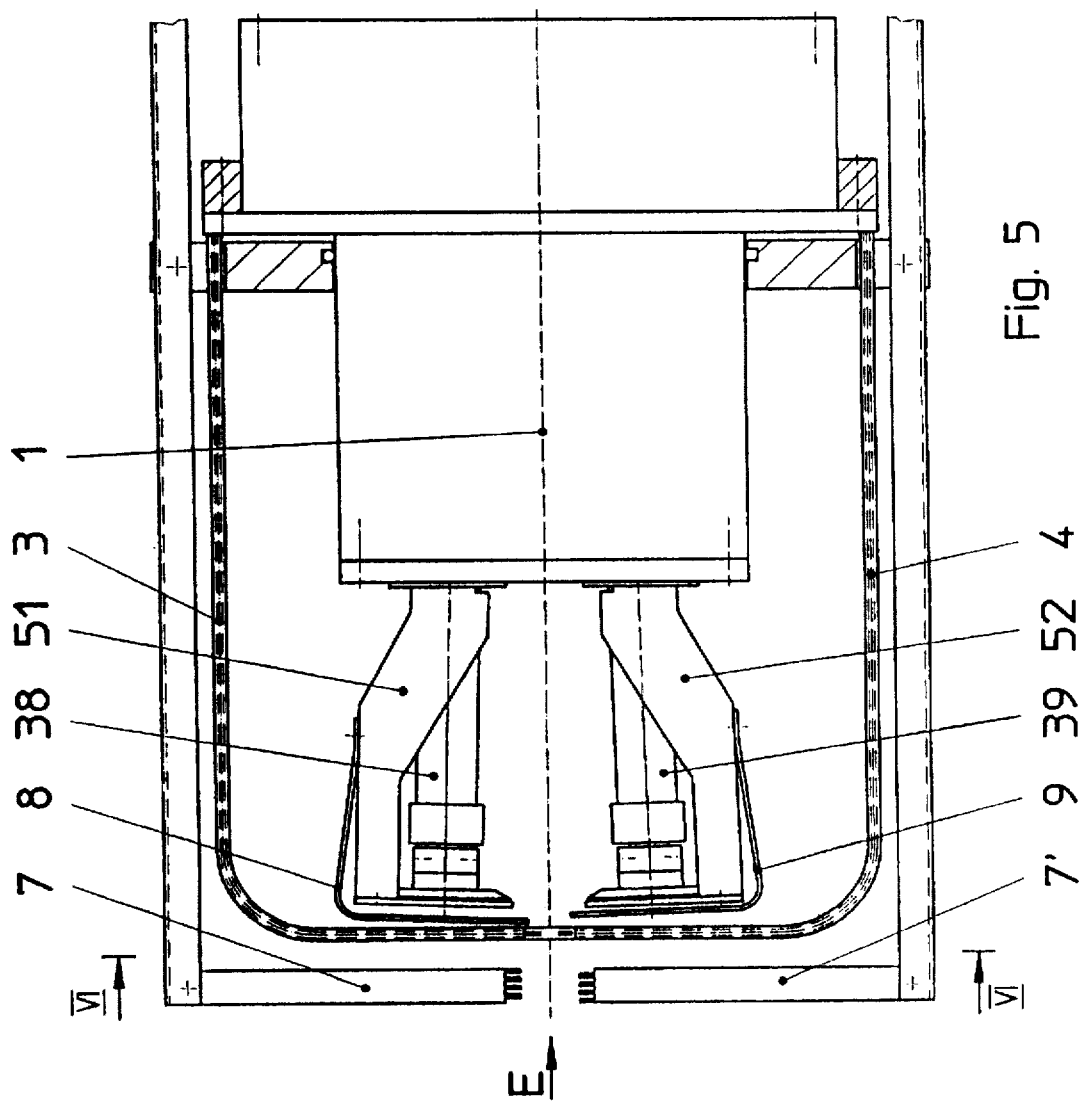

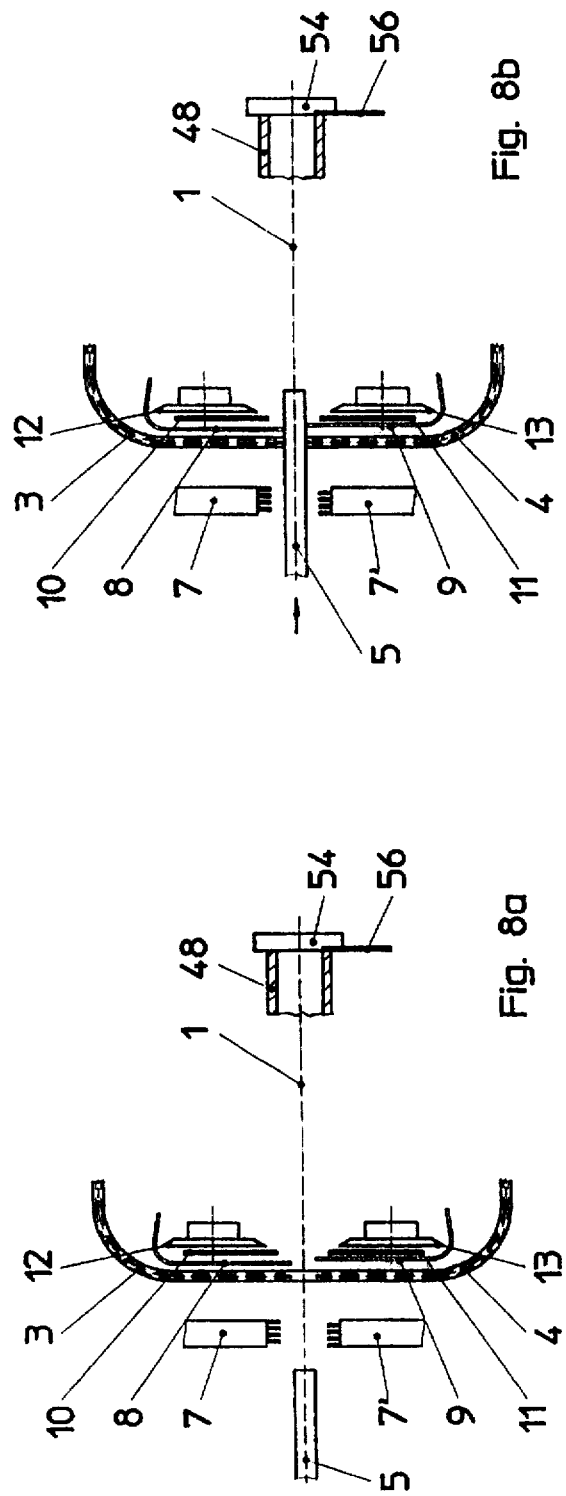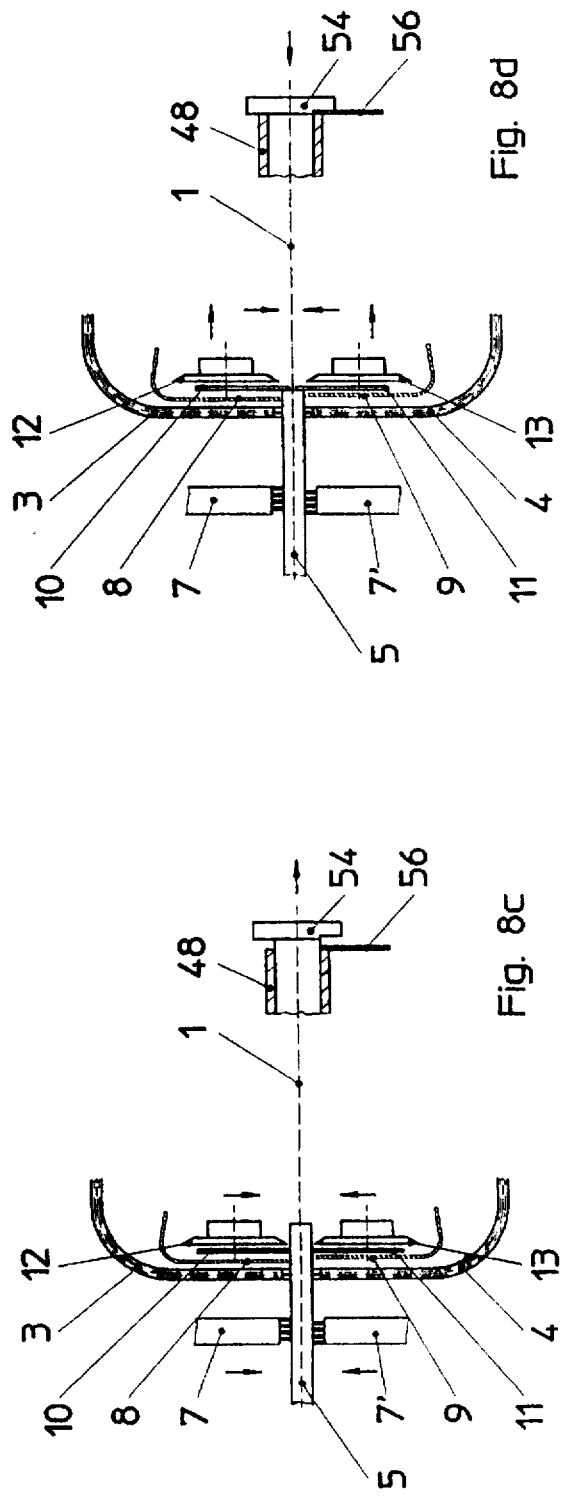

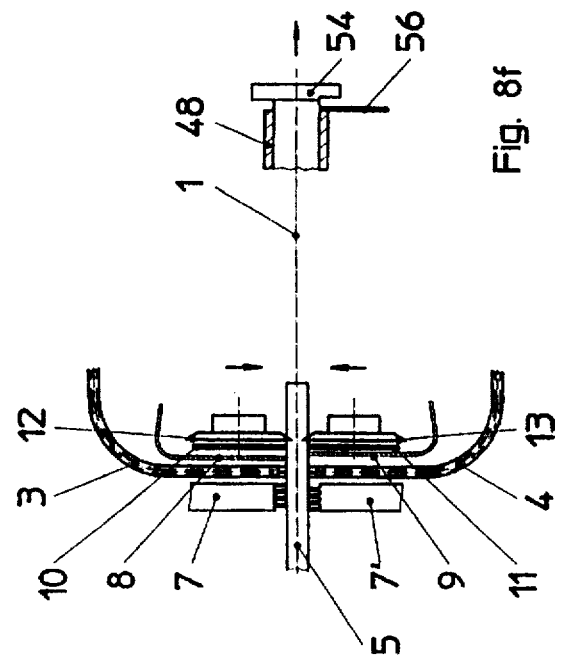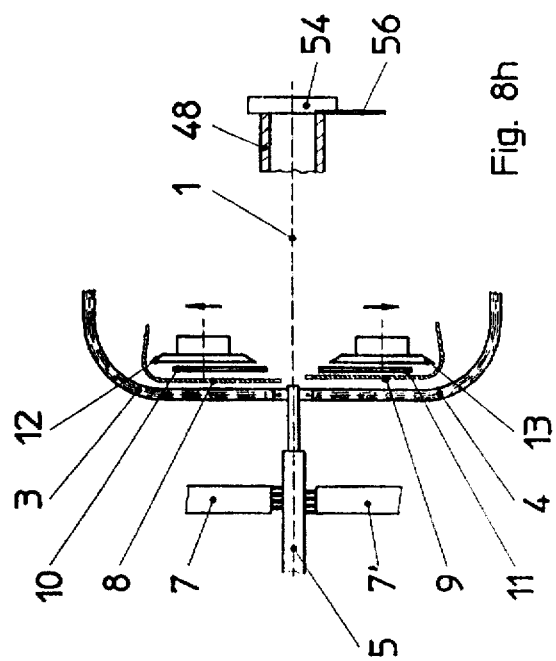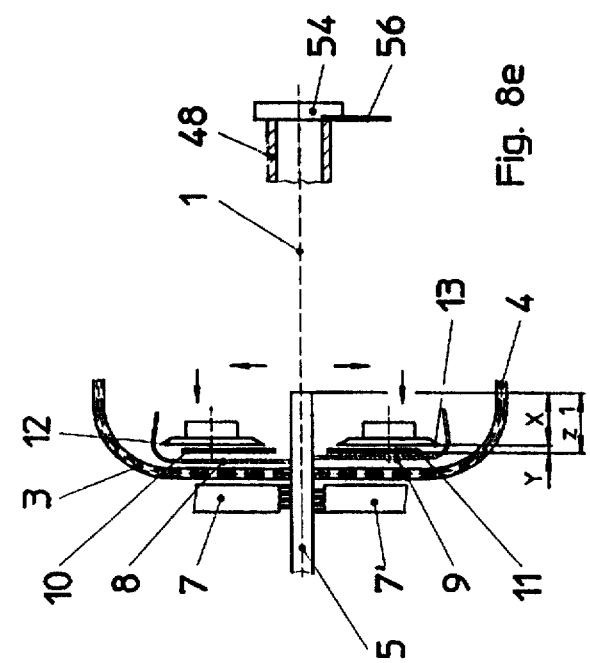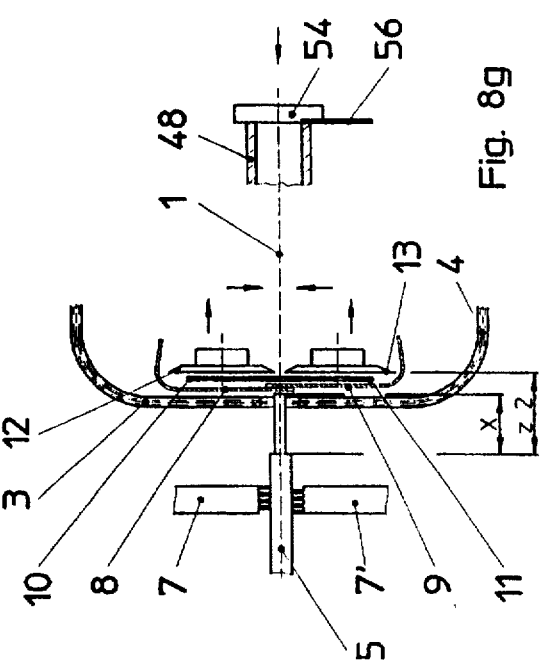

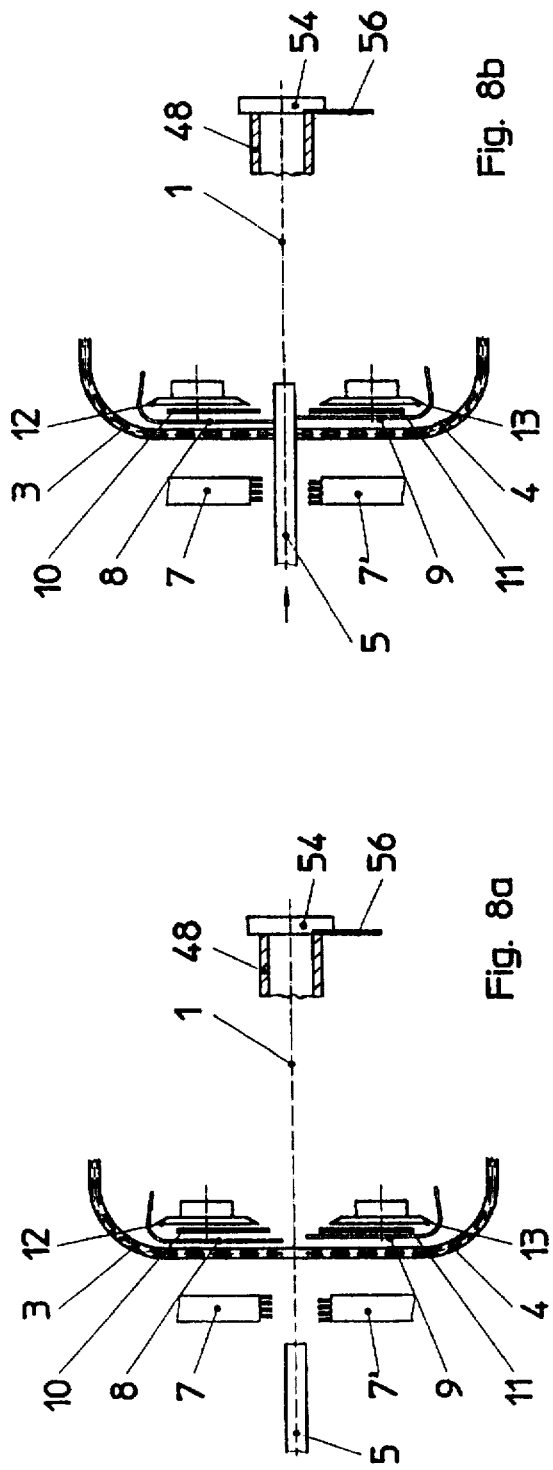

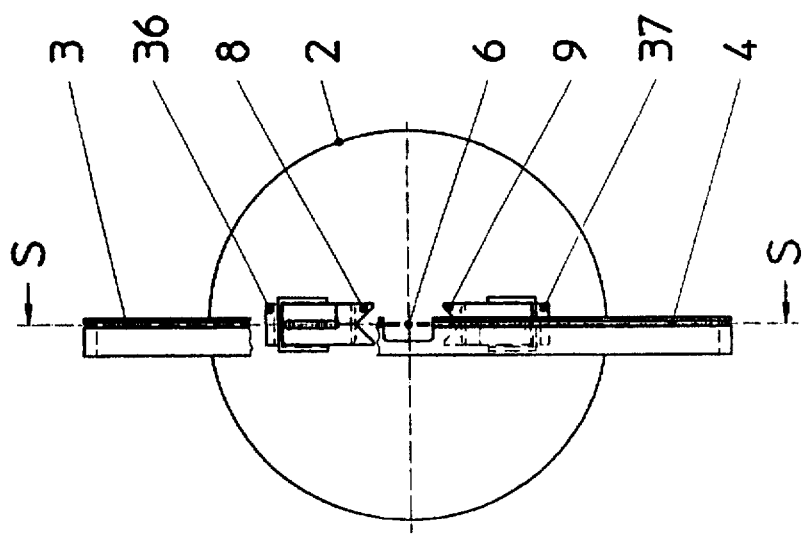
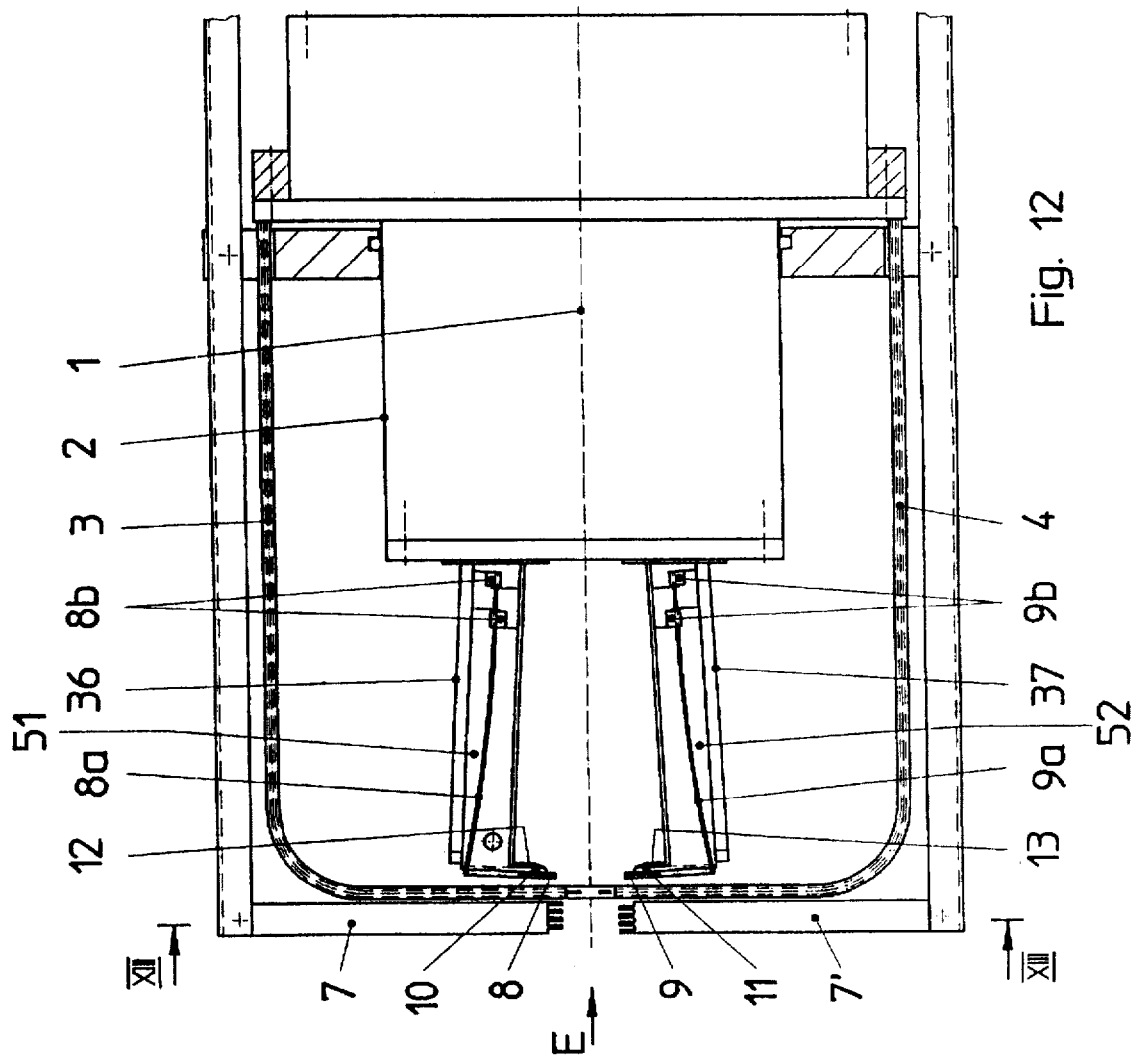
Fig. 13
Fig. 12

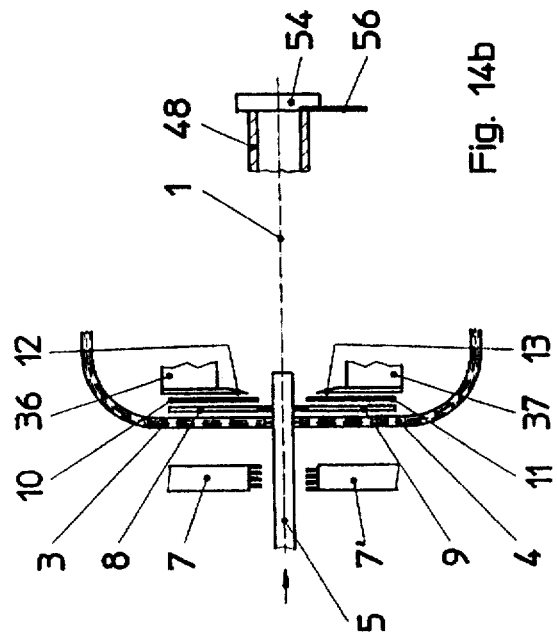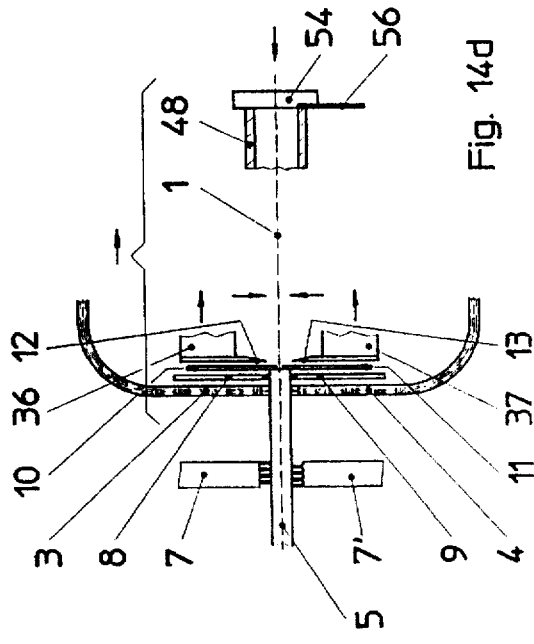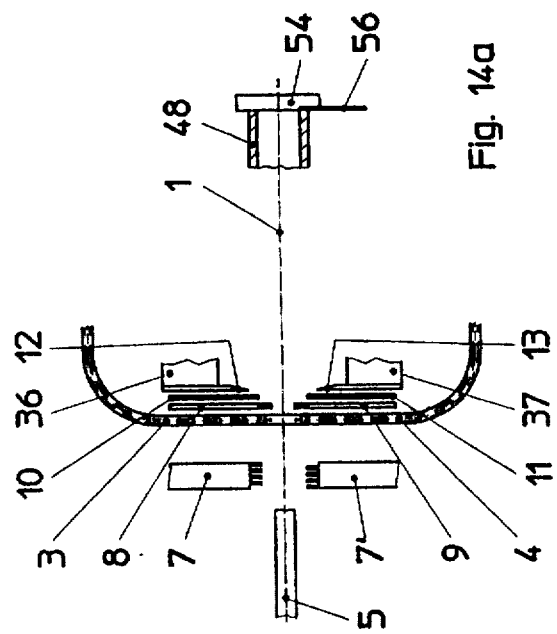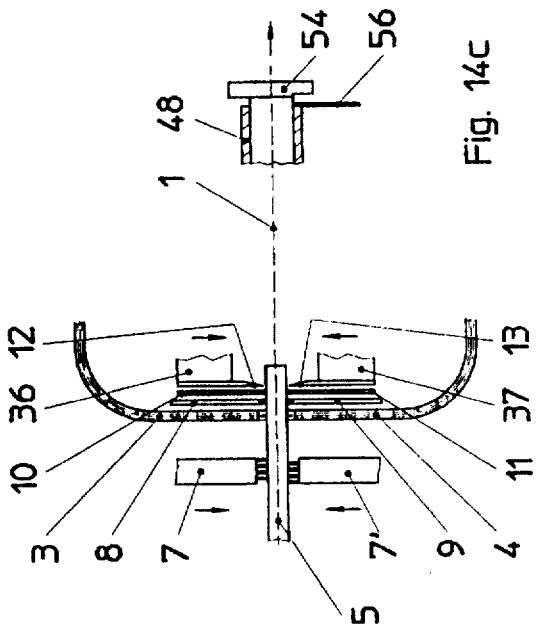

5,781,984

1
APPLIANCE FOR CUTTING-OFF AND/OR STRIPPING INSULATION

This is a division of application Ser. No. 08/404,856, filed on Mar. 15, 1995 now U.S. Pat. No. 5,596,802.

The invention covers a process as well as an appliance used to cut-off and/or strip at least one layer of a sheathing around a cable-like conductor.

The insulation stripping appliances available up to now have a considerable disadvantage in that at least one layer of a sheathing of a then, very flexible cable-like conductor cannot be cut-off and/or stripped in an easy and rational way as such conductor end sections sag considerably when inserted into an insulation stripping appliance, which results in the fact that their initial positions cannot be defined precisely on the one hand, and on the other hand their free end cannot be used to actuate a stop and contact part to activate the insulation stripping appliance as this is usual with conductors which are fairly stable.

SUMMARY OF THE INVENTION

The objective of the present invention is to create a process of the type mentioned at the beginning which does not have the disadvantages of the presently known processes mentioned above, i.e. a process with which at least one layer of a sheathing of an extremely thin, very flexible cable-like conductor even can be cut-off and/or stripped very precisely in an easy and very rational way in its longitudinal direction.

This objective is achieved with a process of the type mentioned at the beginning, which will be described below.

Useful further designs of the process according to the invention are described below.

In addition, apparatus for the performance of the process according to the invention will be described below.

Below the invention will be explained by example of the drawings.

BRIEF DESCRIPTION OF THE DRAWING

FIG. 5 shows a plan view from the top of the rotor head in direction of arrow D in FIG. 1 however with the cutting knife in horizontal direction for unobstructed entry of the conductor end section to be stripped.

FIG. 6 shows a section longitudinal to the line VI—VI in FIG. 5.

FIGS. 8a and 8h show schematically the most important steps of the process according to the invention in horizontal view in analogy to FIG. 5.

FIG. 10 shows a section longitudinal to the line X—X in FIG. 9.

FIG. 11a shows a front view of a centring tongue displaceable in vertical direction opposite to the action of a wire spring in direction of arrow C in FIG. 10.

2

FIG. 11b shows a section longitudinal to line E—E in FIG. 10 in direction of a blade centring jaw.

Figure 9:
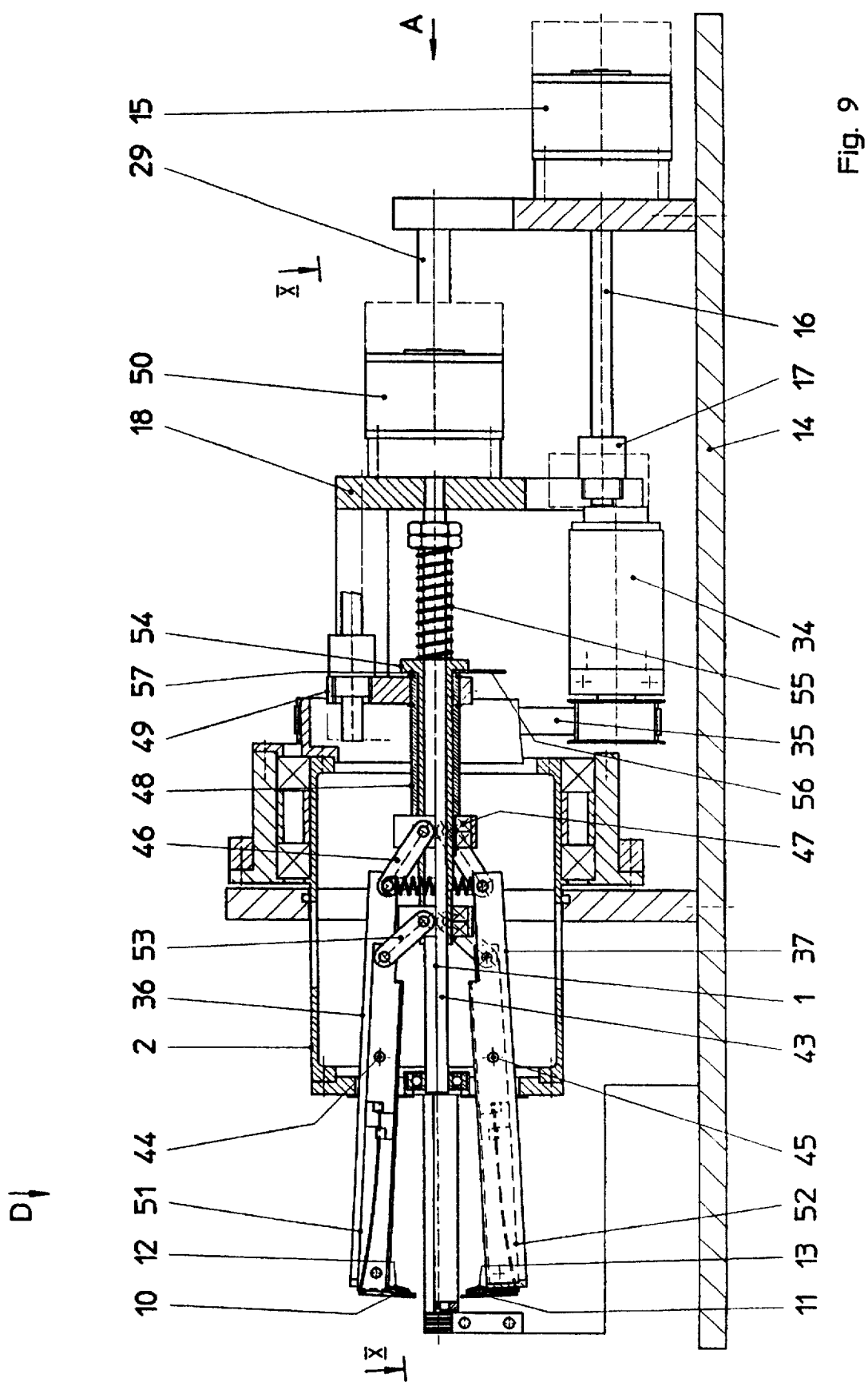
FIG. 9 shows a longitudinal section through a second example of the style of an insulation stripping appliance according to the invention.
Figure 14E:
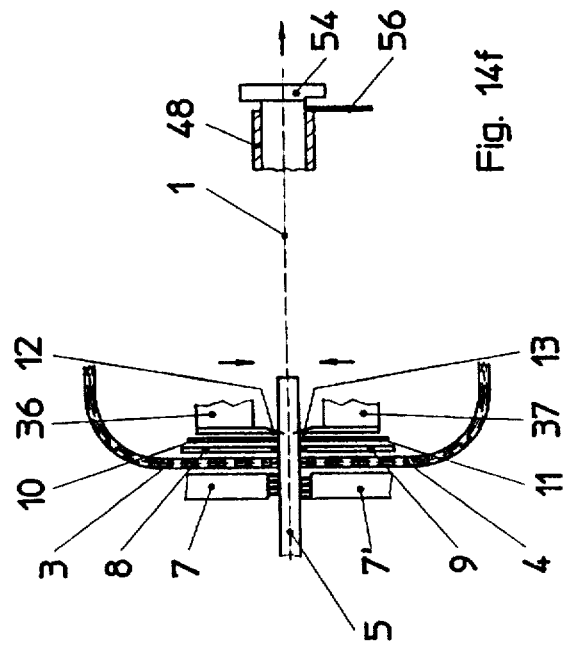
Figure 14F:
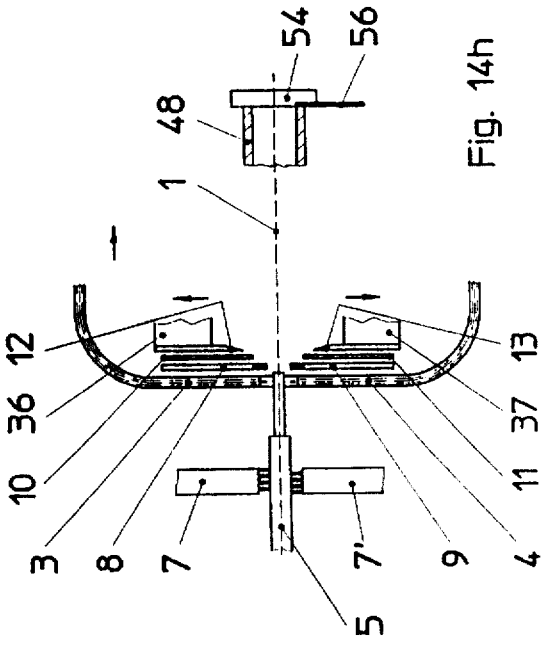
Figure 14G:
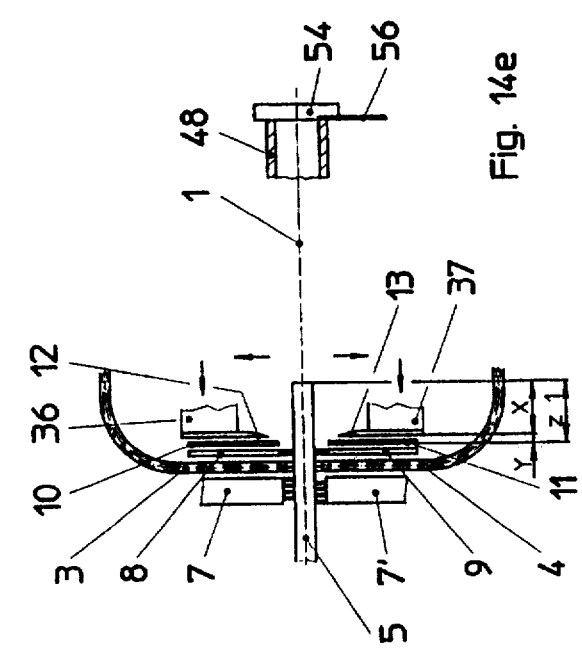
Figure 14H:
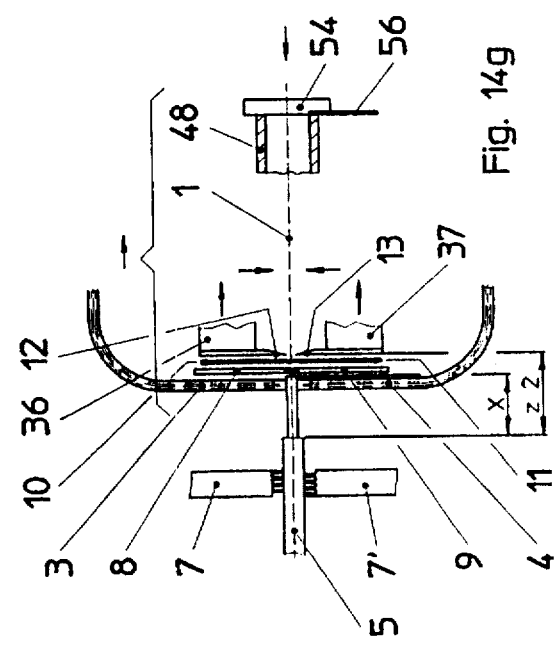

FIG. 12 shows a plan view from the top of the rotor head in direction of arrow D in FIG. 9, however with the cutting knife in horizontal direction for unobstructed entry of the conductor end section to be stripped.

FIG. 13 shows a section longitudinal to the line XIII—XIII in FIG. 12, and

FIGS. 14a through 14h in analogy to FIGS. 8a through 8h show schematically the most important steps of the insulation stripping process by means of the insulation stripping appliance represented in FIG. 9.

DESCRIPTION OF THE PREFERRED EMBODIMENTS

As can be seen in FIGS. 1 through 8, the first example of the style of an appliance according to the invention shown in these drawings has a rotatable rotor head 2 to be displaced in longitudinal direction of its longitudinal axis 1.

An optical monitoring system provided with light guides 3 and 4 made as insensitive as possible to light from external sources has been provided for rough alignment and optical scanning of a conductor end section 5 (cf. FIGS. 8a through 8h) to be worked with a receptacle 6 for insertion of the latter.

Figure 7:
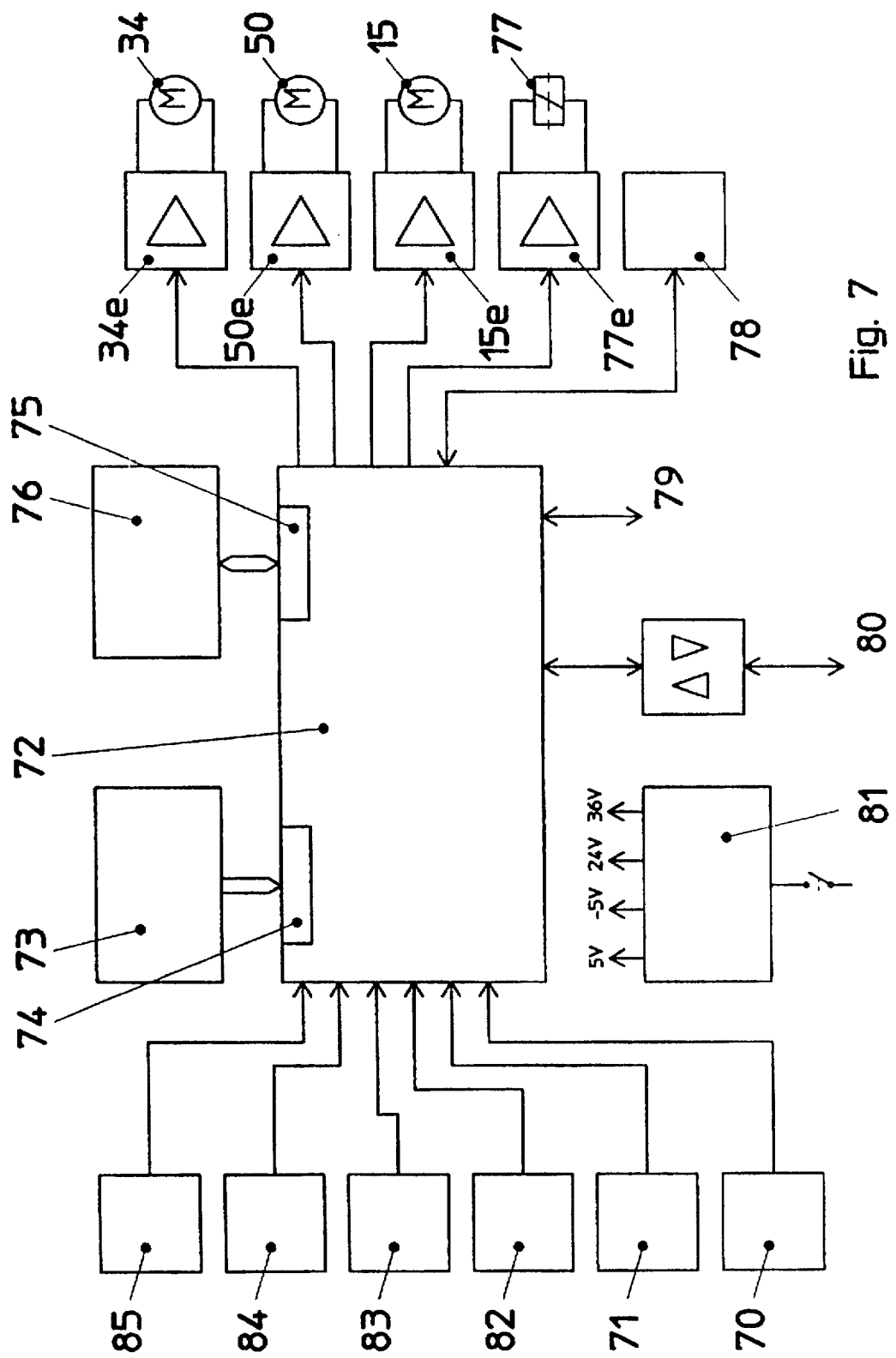
FIG. 7 shows a block diagram of the appliance represented in FIG. 1 through FIG. 6.

As can be seen in FIG. 7, the optical monitoring arrangement has been linked to an analysing circuit 70, the latter being designed in such a way that the initial position of the conductor end section 5 inserted is determined and subsequently the cut-off and insulation stripping process is initiated when a conductor end section 5 to be stripped is inserted in the appliance and thus in the receptacle 6. For the attachment of the axial starting position of the conductor end section 5 to be stripped, two swivelling clamping jaws 7 and 7' have been provided which in a known process can be swivelled from an open position (FIGS. 5 and 8a) to a clamping position (FIGS. 8c through 8h).

Figure 4:
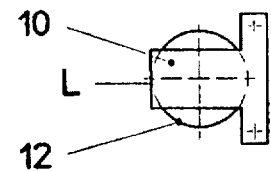
FIG. 4 shows a front view of a blade centring jaw in direction of arrow C in FIG. 3.

For rough centring of the conductor end section 5, centring tongues 8 and 9 spring mounted to the outside and attachable to the latter, and for fine centring, as can be seen especially froth FIGS. 4, 5, and 6, two blade centring jaws 10 and 11 have been provided for radial contact to the outside of the sheathing of the conductor to be worked deforming the conductor end section 5 at the centring position as little as possible.

Directly next to the two blade centring jaws 10 and 11 in lateral direction, two cutting knives 12 and 13 have been provided for stripping the insulation of a conductor end section, to be brought to a precisely determinable cutting depth for the layer of the sheathing of the conductor to be removed, independent of the rotating movement around the conductor end section to be worked determined by the rotation of rotor head 2. These disk-type diametrically located cutting knives have been designed in the type of a milling cutter separately driven.

For the displacement of the centring jaws 10 and 11 adjustable in radial direction and both arranged on rotor head 2, and for the displacement of cutting knives 12 and 13 to be moved in axial direction of rotor head 2 to the respectively requested cut-off length, and for return of these parts after severing the requested sheathing section, an advance and retraction system has been provided, which comprises stepping motor 15 firmly connected to base plate 14, which by means of a drive-connected spindle 16 acts on a spindle nut 17, which in turn is firmly connected to a carrying part 18. By means of four connecting pins, carrying part 18 is screwed down to a carrying plate which by means of a socket section is used for rotating bearing of rotor head 2, and which by means or stepping motor 15 can be displaced as one unit on two rod-type guide shafts to different insulation stripping and return positions.

Rotor head 2 is driven by a direct-current motor 34 via a toothed belt 35.

Figure 1:
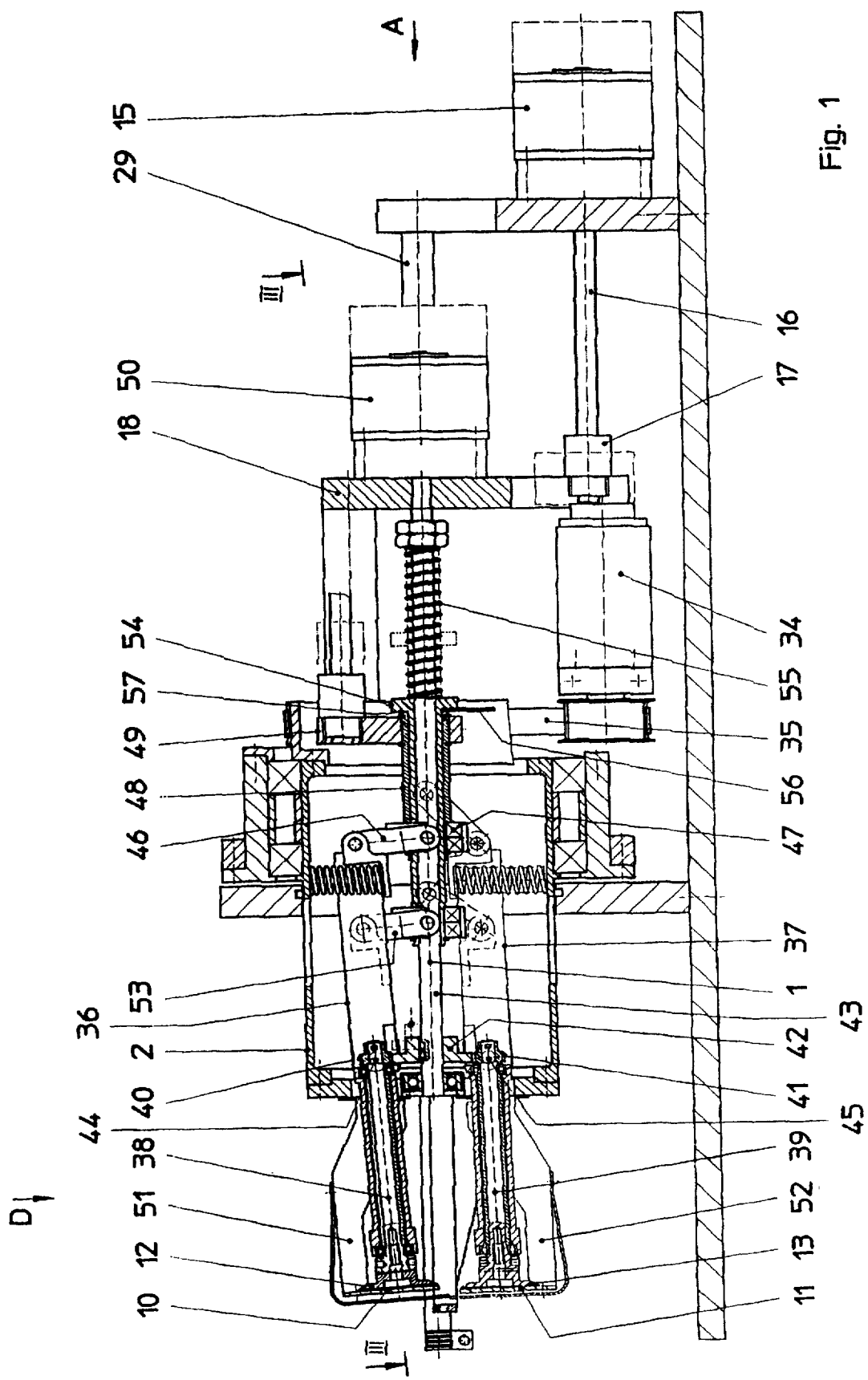
FIG. 1 shows a longitudinal section through a first example of the style of an insulation stripping appliance according to the invention.
Figure 2:
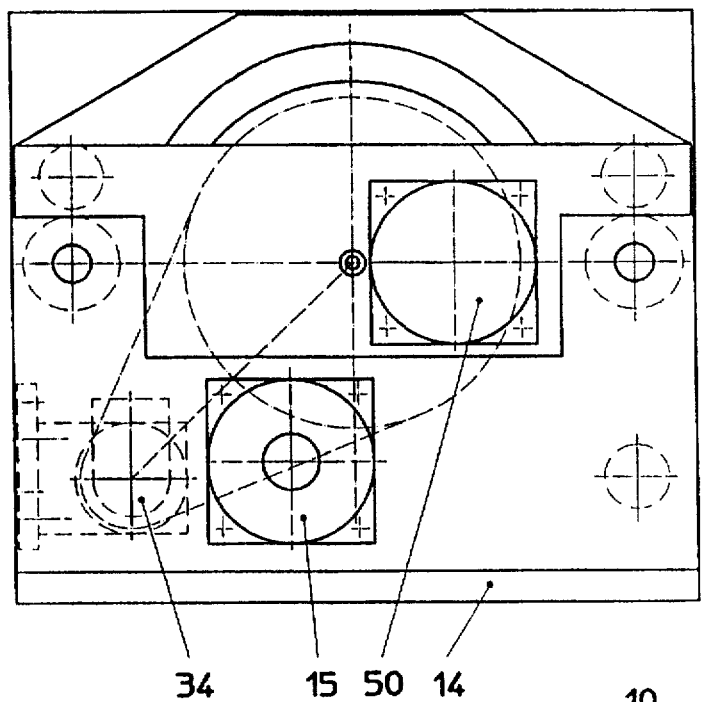
FIG. 2 shows a front view of the appliance in direction of arrow A in FIG. 1.
Figure 3:
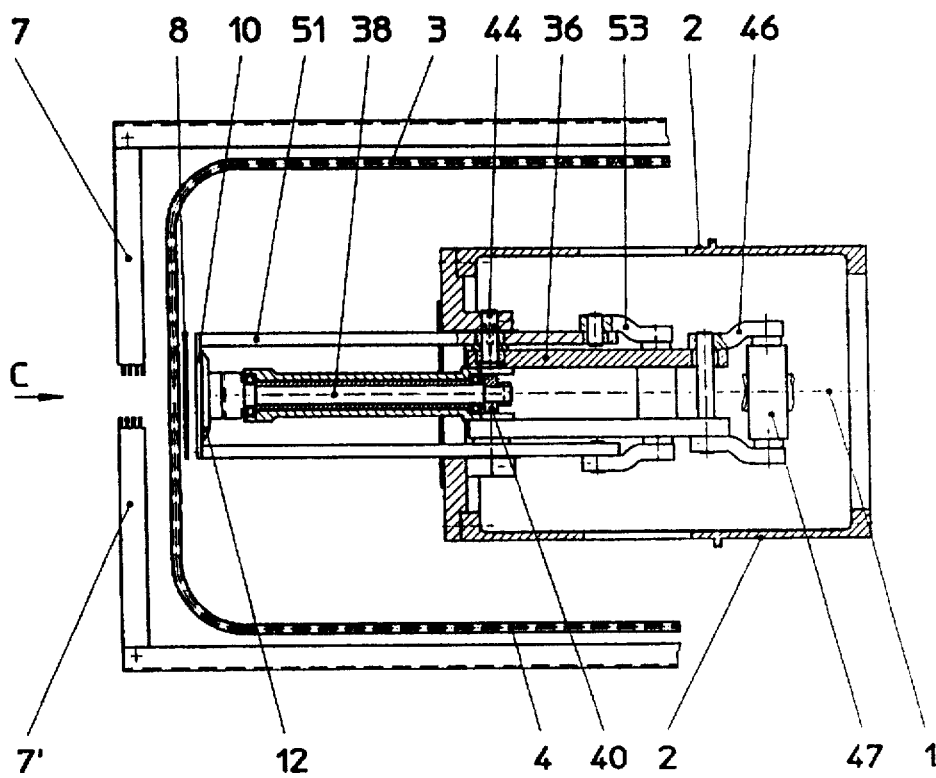
FIG. 3 shows a section longitudinal to the line III—III in FIG. 1.

As can be seen especially from FIGS. 1 and 3, the cutting knives 12 and 13 in the style shown are pivoted on one lever arm end of one two-arm lever arrangement 36, respectively 37 each, and make contact to their drives by means of one drive shaft 38, respectively 39 each, and a fixed toothed wheel 40, respectively 41 with a toothed wheel 42 standing still relative to rotor head 2. Toothed wheel 42 in turn is rigidly attached to a non-rotating shaft 43 so that when rotor head 2 turns around its longitudinal axis 1 the disk-type cutting knives 12 and 13 in turn start rotating around their rotational axis.

As can be seen from FIGS. 1 and 3, the two lever arrangements are pivoted in rotor head 2 on one swivelling axle 44, respectively 45 each located vertically to longitudinal axis 1 of the rotor head.

Of course it is also conceivable to design this lever arrangement 36 and 37 as one-arm levers by locating the swivelling axle firmly attached to rotor head 2 at the end of the lever pointing away from the cutting knife and by attaching the toggle lever arrangement used to adjust the lever between the two ends of the appertaining lever.

At the other end pointing away from cutting knives 12, respectively 13, the two lever arrangements 36 and 37 are linked to one another in an adjustable synchronous way by means of a toggle-lever arrangement 46 as well as a ball bearing unit 47 with a non-rotating displacement unit 48 longitudinally adjustable to the longitudinal axis 1 of the rotor head, respectively shaft 43, whereby in FIG. 1 the cutting knife 12 is shown in zero point position, i.e. in one of the extreme positions in the upper part, and the second cutting knife 13 in the other extreme position in the lower part in order to be able to show both possible and positions of the two cutting knives.

For drive, the displacement unit 48 is linked to stepping motor 50 by means of the intermediate part 49, and is precisely adjustable longitudinally to shaft 43 and thus relative to rotor head 2 by help of the latter.

For precise centring of the conductor to be stripped a blade centring jaw 10, respectively 11 each has been provided directly in front of both rotating cutting knives 12 and 13, which are arranged at one end to another two-arm lever arrangement 51, respectively 52 each. The two latter are pivoted on rotor head 2 around a swivelling axle vertically to the longitudinal axis 1 of the rotor head, whereby in the present case these swivelling axles are identical with the swivelling axles 44 and 45 of the two allocated cutting knife lever arrangements 36 and 37. In this way the blade centring jaws 10 and 11 are slewable relative to the cutting knives 12, respectively 13 and almost parallel to them.

The lever arrangements 51 and 52 of the blade centring jaws are linked synchronously and exactly symmetrically displaceable to a second displacement unit 54 adjustable longitudinally to the longitudinal axis 1 of the rotor head on the other end located away from the respective blade centring jaw 10, respectively 11.

Viewed in opening direction of centring jaws 10 and 11, i.e. to the right in FIG. 1, this second displacement unit 54 is spring-supported indirectly, in its displacement direction by means of a pressure-adjustable pressure spring 55, against the first displacement unit 48 allocated to cutting knives 12 and 13, and makes contact in closing direction of the blade centring jaws 10 and 11, i.e. to the left in FIG. 1, by means of a pressure sensor 56 to the stop formed by the right front side 57 of the first displacement unit 48. This way it is rendered possible that the very weak clamping centring force of the blade centring jaws 10 and 11 on the initial outside diameter of the conductor to be stripped remains practically unchanged at the centring position by the position of the cutting knives 12 and 13, i.e. by the blade diameter of the latter, even in case of very prominent insulation stripping depths.

Of course, it is also conceivable to adjust the first and second displacement unit 48 and 54 independently of each other along their common longitudinal axle 1 by means of one separate stepping motor each, leaving away pressure spring 55.

In order to obtain a perfect fine adjustment of the conductor to be stripped during the insulation stripping process, the blade centring jaws 10 and 11 in idle position protrude slightly, as can be seen especially in FIGS. 4, 8, and 8a, over the cutting edge of cutting knives 12 and 13 in the area of the conductor insertion point L under the action of the spring force of pressure spring 55.

The various consecutive steps of the process according to the invention will be explained below schematically by means of FIGS. 8a through 8h:

As can be seen from FIGS. 8a and 8b, the conductor end section 5 to be worked is inserted in the appliance, and placed between the cutting knives 12 and 13 in the receptacle 6 of the monitoring arrangement 3, 4, 70, whereupon the latter will cause a closing action of the clamping jaws 7 and 7' as well as an approaching action of the lever arrangement 51, 52, thus initiating firstly the rough centring action 8, 9 and secondly a fine centring action 10, 11 until contact is made to the conductor end section 5 to be stripped, whereby the protruding blade centring jaws 10 and 11 are moved slightly outwards relative to the cutting knives 12 and 13 and, as can be seen in FIG. 8c, thus the displacement unit 54 is moved away from the right front side 57 of the first displacement unit 48 (to the right in FIGS. 1 and 8c), and thus away from pressure position on pressure sensor 56. By this action, a determined lower pressure threshold value is fallen short of which causes the pressure threshold analysing system 71 to release a scan starting signal, which is transmitted to the micro-processor control 72, and in the latter the conductor scanning process is initiated.

Subsequently rotor head 2 is moved to the right in these drawings by means of a stepping motor 15 linked to the micro-processor control 72 by an output stage 15e until the blade centring jaws 10, 11 reach the conductor end (FIG. 8d) and slide off the latter which causes the blade centring jaws 10 and 11 prior pressed back by the force exerted by pressure spring 55 to move slightly inside relative to the allocated cutting knives 12 and 13, and thus the displacement unit 54 is moved against stop 57 (to the left in FIGS. 1 and 8d) and hence to pressure contact on pressure sensor 56, as can be seen in FIG. 8d. By this action the lower pressure threshold value entered in the analysing system 71 is fallen short again which will cause a scan end signal to be released by the pressure threshold analysing system 71 linked to pressure sensor 56, which is transmitted to the micro-processor control 72, and in the latter the axial position of rotor head 2 corresponding to the conductor end section, and thus of cutting knives 12 and 13 is memorised.

Subsequently, the cutting knives 12 and 13 as well as the blade centring jaws 10 and 11 acting as conductor and section detectors beforehand are moved to the open position by means of stepping motor 50 (FIG. 8e), and are then moved so far to the left by stepping motor 15 that the distance x of the cutting position of cutting knives 12, 13 to the end of the conductor corresponds to the requested insulation stripping length.

Subsequently the cutting knives 12, 13 are moved towards each other to the requested cutting diameter by means of stepping motor 50 (FIG. 8f); rotor head 2, and in the present case the cutting knives 12, 13 as well are rotated by means of direct-current motor 34 so that the requested sheathing layer is cut through; and, the thus severed sheathing layer is removed to the right by the cutting knives 12, 13 on account of the displacement of rotor head 2 driven by stepping motor 15 (FIG. 8g), whereupon this insulation stripping process is terminated; the cutting knives 12, 13 are moved to open position again (FIG. 8h), and subsequently another graduated insulation stripping process can be carried out on the same conductor end section 5.

The stepping motor 50 used for the adjustment of the cutting diameter of the cutting knives 12, 13 and the blade centring jaws 10, 11, respectively used for the adherence to the adjusted position with rotor head 2 rotating or at a standstill is connected up to the microprocessor control 72 by means of an output stage 50e, as can be seen from FIG. 7.

The stepping motor 15 used for the adjustment of the rotor head carriage along rotor head axle 1 is connected up to the micro-processor control 72 by means of an output stage 15e, whereby the control itself is connected up to an input keyboard 73 via interface 74, and to an LCD display 76 via interface 75.

In a known process the clamping jaws 7, 7' are moved into their conductor clamping position against a spring force by means of an electromagnet 77, whereby for control this electromagnet 77 is connected up to the microprocessor control 72 via an output stage 77e, as can be seen from FIG. 7.

In addition, the micro-processor control 72 is connected up to digital inputs and outputs 78, an extension interface 79, a serial interface 80, a feeder unit 81, a force sensor 82 analysing the feed force of the cutting knives, the limit switches 83 allocated to the rotor head carriage, the limit switches 84 allocated to the rotor head carriage as well as to the position sensors 85 scanning the rotation position of rotor head 2. The latter sensors are used to control the drive of rotor head 2 in such a way that the cutting knives 12, 13 are located in a horizontal plane (cf. FIG. 5) to permit unobstructed insertion of the conductor end section 5 from the top into the appliance during the conductor insertion phase.

In a known process, the zero point adjustment of the cutting knives 12, 13 can be performed by means of a spindle.

Instead of rotatable driven disk-type cutting knives 12 and 13, non-rotating cutting knives with a straight cutting edge can be provided as well of course, as is a known feature as such, which can be seen by means of the second style shown in FIGS. 9 through 14h below. These drawings contain analogue parts with the same reference designations as in the first style so that a repetition of the explanation of these parts is superfluous.

As can be seen from FIGS. 9 through 13, the cutting knives 12 and 13 can be arranged replaceable on one lever arm end of a two-arm cutting knife lever arrangement 36, respectively 37 in this second style.

The blade centring jaws 10 and 11 allocated to the two cutting knives 12 and 13 which can be displaced relative and, in an independent process, parallel to the latter, are attached to one lever arm end each of a two-arm blade centring jaw lever arrangement 51 and 52 each, and have been provided with a centring tongue 8, respectively 9 each. These centring tongues 8, respectively 9 can be displaced to the top from the lower position shown in FIG. 11a against the spring action of one wire spring 8a, respectively 9a each. The rear end sections of these wire springs 8a and 9a are firmly attached to the blade centring jaw lever arrangements 51, respectively 52 by means of the attachment elements 8b, respectively 9b.

What is claimed is:

1. Appliance for cutting-off and/or stripping a section of at least one layer of sheathing from a cable-like conductor, the conductor having a longitudinal axis, said appliance comprising:
   at least one conductor scanning arrangement for determining a starting position of the conductor in a longitudinal direction along the longitudinal axis;
   a unit for initiating at least one of a cutting-off and stripping process when the conductor is in the starting position;
   clamping jaws for fixing the conductor in the starting position;
   blade centering jaws for placing the longitudinal axis of the conductor in a defined position by non-deforming contact with the outside of the sheathing in a radial direction perpendicular to the longitudinal axis;
   two cutting knives which are mounted directly next to said blade centering jaws and are spaced apart in the radial direction on opposite sides of the longitudinal axis;
   a feed and return arrangement coupled to said blade centering jaws and said cutting knives for effecting common displacement of said blade centering jaws and said cutting knives in the radial direction from a rest position in order to place said blade centering jaws in contact with the outside of the sheathing and to bring said cutting knives to a certain cutting depth in the at least one layer of sheathing, and to return said blade centering jaws and said cutting knives to the rest position after cutting the at least one layer of sheathing; and
   a rotor head carrying said feed and return arrangement and displaceable parallel to the longitudinal axis to establish a determined cut-off length of the at least one layer of sheathing.

2. Appliance as set forth in claim 1, characterised by the fact that an optical monitoring arrangement (3, 4) is provided in axial direction of the conductor end section (10, 11) to be stripped located directly next to the blade centring jaws (10, 11), which initiates the cut-off and/or insulation stripping process by means of an electronic analysing circuit (70) after detection of a conductor end section (5) inserted.

3. Appliance as set forth in claim 1, characterised by the fact that it has been provided with two disk-type cutting knives (12, 13) driven in the kind of a milling cutter by a circumferential speed deviating from the roll-off speed, the speed of which can be adjusted preferably.

4. Appliance as set forth in claim 1, characterised by the fact that the cutting knives (12, 13) can be adjusted by swivelling arms (36, 37) pivoted on swivelling axles (44) in rotor head (2) running parallel to the rotating axle (1) of the rotor head to permit an adjustment of the cutting diameter.

5. Appliance as set forth in claim 1, characterised by the fact that the cutting knives can be moved towards each other, respectively away from each other by means of a stepping motor (34) for adjustment of the cutting diameters produced by the cutting knives (12, 13).

6. Appliance as set forth in claim 3, characterised by the fact that the rotating movement of the cutting knives (12, 13) around their rotation axle is interrupted for removal of a severed sheathing section, i.e. during the return movement of rotor head (2) away from the clamping jaws (7, 7').

7. Appliance as set forth in claims 3, characterised by the fact that the rotating movement of rotor head (2) is interrupted or switched to an oscillating swivelling movement for removal of a severed sheathing section, i.e. during the return movement of rotor head (2) away from the clamping jaws (7, 7').

8. Appliance as set forth in claim 1, characterised by the fact that the cutting knives (12, 13) are attached to the end of a two-arm lever arrangement (36, 37) each, whereby the two latter are pivoted in rotor head (2) rotating around swivelling axles (44, 45) vertical to the rotor head longitudinal axle (1) each, and whereby the other end pointing away from the cutting knife (12, 13) is connected up synchronously adjustable to a displacement unit (48) adjustable along the longitudinal axle (1) of the rotor head.

9. Appliance as set forth in claim 8 characterised by the fact that one blade centring jaw (10, 11) each has been provided directly in front of each cutting knife (12, 13), and that these centring jaws (10, 11) are attached at one end to another two-arm lever arrangement (51, 52) each, whereby the two latter are pivoted in rotor head (2) rotating around swivelling axles (44, 45) vertical to the rotor head longitudinal axle (1) each, and whereby the other end pointing away from the blade centring jaws (10,11) is connected up synchronously and precisely symmetrically adjustable to a second displacement unit (54) adjustable along the longitudinal axle (1) of the rotor head by means of another toggle-lever arrangement (53).

10. Appliance as set forth in claim 3, characterised by the fact that for drive the cutting knives (12, 13) pivoted in rotor head (2) make contact via toothed wheels to a toothed wheel (42), respectively toothed ring standing still or rotating at a different speed to the rotor head (2).

11. Appliance as set forth in claim 1, characterised by the fact that a rough centring unit (8, 9) each spring-mounted in radial direction relative to the longitudinal rotor axle (1) right next to the blade centring jaws (10, 11), whereby these centring units have been designed and arranged in such a way that they rise over the blade centring jaws (10, 11) looking along the longitudinal rotor axle (1), and at least partially encompass the conductor end section (5) to be centred.

12. Appliance as set forth in claim 9, and characterised by the fact that the two lever arrangements (36, 37; 51, 52) are pivoted in rotor head (2), and the rotor head axle (1) runs in the common swivelling level (S) of these two lever arrangements.

* * * * *